United States Patent [19]

Brace

[11] 4,078,453
[45] Mar. 14, 1978

[54] HYDRAULIC POWER TRANSMISSION

[76] Inventor: Russell Lyle Brace, 1707 29th Ave., Gulfport, Miss. 39501

[21] Appl. No.: 712,258

[22] Filed: Aug. 6, 1976

[51] Int. Cl.$^2$ .................. F16H 57/10; F16D 31/04
[52] U.S. Cl. .................................... 74/782; 192/61
[58] Field of Search ............... 74/782, 784, 370; 192/61; 418/196, 190, 188

[56] References Cited

U.S. PATENT DOCUMENTS

| | | | |
|---|---|---|---|
| 1,107,944 | 8/1914 | Herpolsheimer | 192/61 |
| 1,686,687 | 10/1928 | Kuhn | 418/190 |
| 1,935,400 | 11/1933 | Junkers | 192/61 |
| 2,282,395 | 5/1942 | Corrigan | 192/61 |
| 3,416,636 | 12/1968 | Ahlen | 192/61 X |

Primary Examiner—Carlton R. Croyle
Assistant Examiner—Leonard E. Smith

[57] ABSTRACT

A hydraulic power transmission of the hydrostatic type comprising a planetary network of rotary gear pumps employing a centrosymmetric internal valve control of pump fluid through the driving shaft, sun gear, and driven shaft, with external cooling of the pump fluid. A secondary hydraulic control means is incorporated to operate the internal control valve with all hydrostatic pressures confined within the pump system.

9 Claims, 10 Drawing Figures

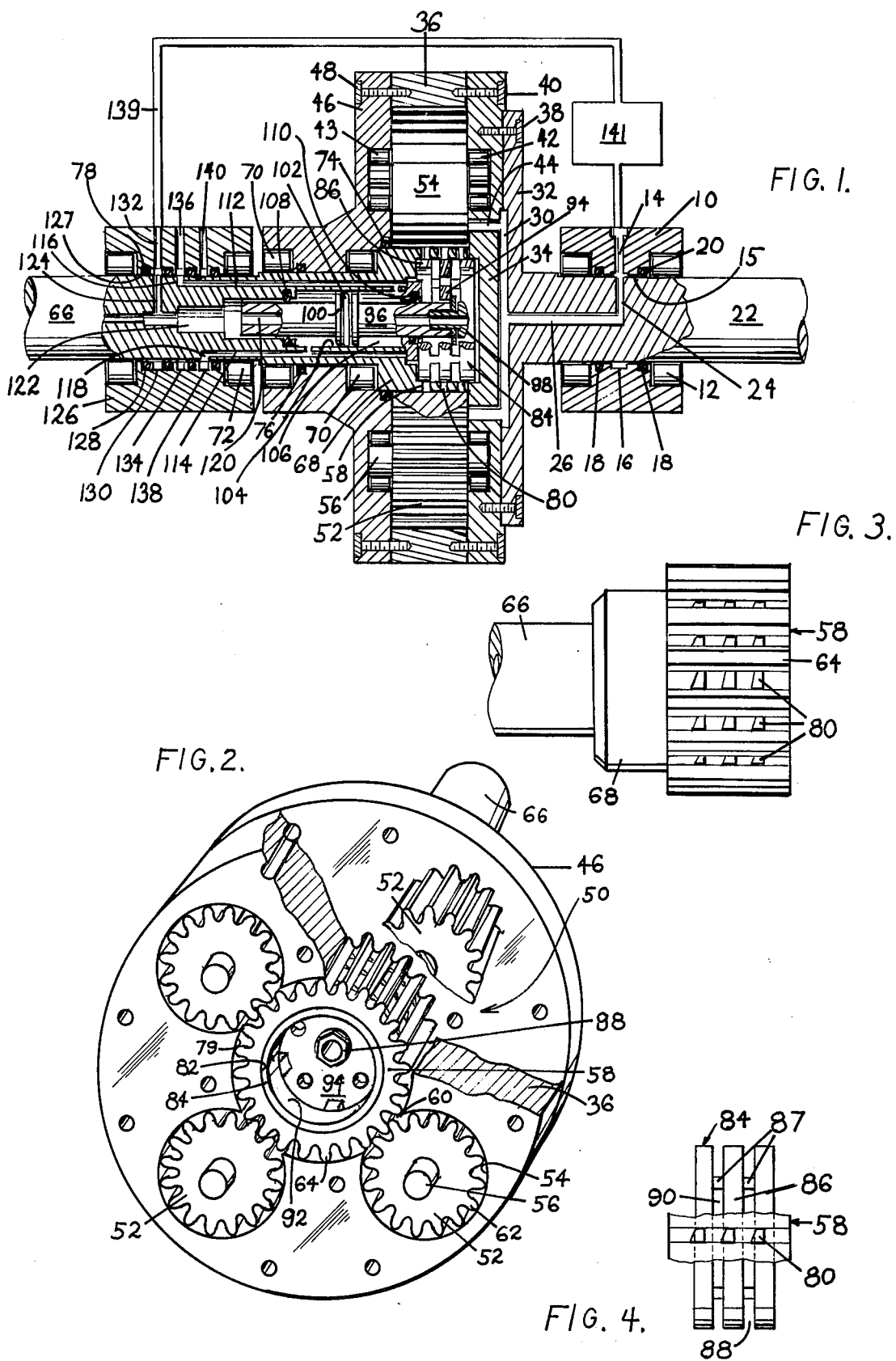

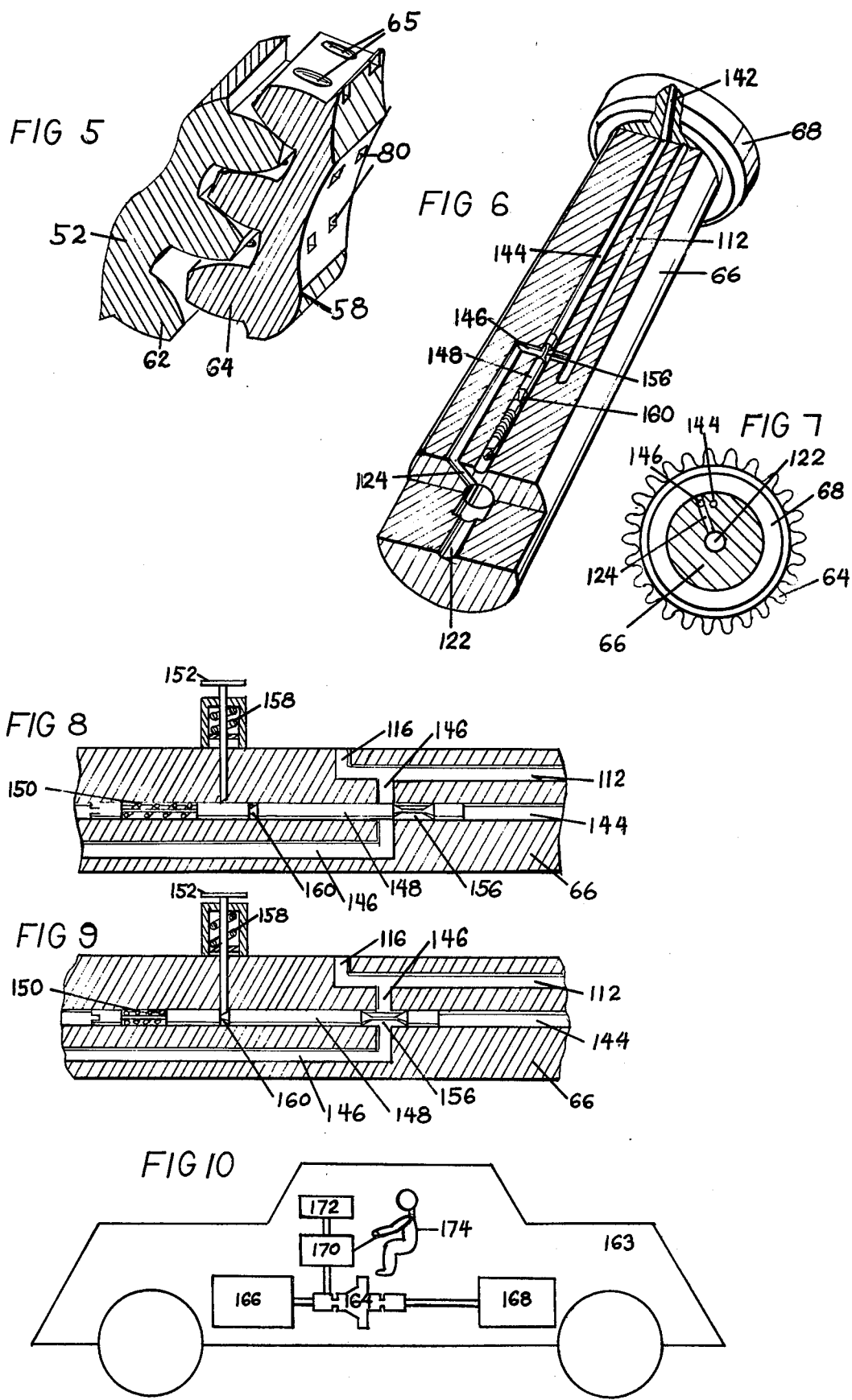

HYDRAULIC POWER TRANSMISSION

BACKGROUND OF THE INVENTION

Heretofore, there have been systems in use in the field of power transmission, conversion, absorption or retardation which have proven to be somewhat efficient and successful in application such as land vehicle, aircraft launch and arresting systems or other mechanisms requiring controlled transfer and conversion of high torque or power.

Systems incorporating friction engaging means such as expending bands co-acting with rotary drum or rotating discs co-acting with pressure plates have been used in the past. However, they are burdened with many problems that are inconvenient, costly and in many cases impossible to contend with.

The most prominent problem involves the extreme heat from friction creating "hard spots" on the friction engaging surfaces resulting in excessive decrease in "slip" (gradual increase in energy transmission) efficiency which defeats the sole purpose of this type of device. Furthermore, the excessive heat and friction makes necessary frequent, costly and inconvenient refurbishment of friction engaging components. Excessive inertia against the drive means also becomes a problem owing to the inordinate size and weight of the components to be actuated in such systems.

As an alternative to friction systems, hydraulics or pump fluid systems avoid many of these problems, particularly in the areas of equipment wear and temperature regulation. The use of pump fluid pressure with lubricating properties through gear pump type systems as a speed and torque transmission means instead of co-acting friction members is obviously less damaging to working components as far as friction wear is concerned. The problems associated with "hard spots" in the friction type devices or distortion of components owing to extreme temperature fluctuations are also avoided with fluid systems which provide a dynamic and flexible medium to absorb the energy input and disperse the heat created, equally throughout the system or through heat exchanging facilities.

Hydrodynamic power absorbers or hydraulic torque converters equipped with heat exchanging facilities in the form of external cooling systems have recently been employed, for example, in land vehicles to provide smooth power transference from the motor or drive means to the drive wheel systems.

However, a problem plaguing these devices is that once engaged, they create constant pressure and motion of the transient fluid to sustain power transfer even after compatible speeds are reached between the drive means and the mechanisms to be driven. Therefore, although these devices have provided efficient operation or power transmission, they are limited by the capacities of the external cooling system which must be sufficiently capable, under continuous duty situations to sustain the viscosity of the pump fluid and prevent the distortion of working components due to excessive heat fluctuation. Furthermore, this mode of operation requires power of its own to operate in addition to the power required to attain the actual speed desired and is therefore inefficient in this respect.

Systems have been developed that incorporate synchronous cutout facilities or valves for suspending fluid flow once compatible speeds are reached between the drive means and the mechanism to be driven. These valve systems may be set to regulate the circulation of the pump fluid into or out of the gear pump pressure chamber to a reservoir or cooling system. In this way, pump fluid pressure and flow can be adjusted for operating at a predetermined power absorption level, and completely suspended once input drive and output mechanisms have reached compatible speeds. Although these devices provide some method of pump fluid control, there remain problems of extreme pressure and unacceptable stress on the external feed lines and control valve systems. These extraneous pressure problems restrict the ability to provide complete uninterrupted control of a full range of power and torque conversions or variations.

SUMMARY OF THE INVENTION

It is therefore an object of this invention to provide a hydraulic transmission of the hydrostatic type using a series of gear pumps in a planetary arrangement incorporating an improved centrosymmetric valve that allows transmission of a wide range of speed and torque conversions and variations between the drive means and mechanisms to be driven, with all extreme hydrostatic pressure confined within the pump system.

A further object of the invention is to provide a secondary hydraulic system for controlling the internal valve that allows either accurate regulation on a predetermined adjustment basis, or on an operational variably adjusting basis.

A still further object of the invention is to provide a unique pump fluid flow system that is extemely efficient in cooling the central components of the pump system which must withstand the greatest heat loads.

Another object of the invention is to provide an automatic pressure relief valve system for disconnecting the drive from the load whenever the power transmission becomes overloaded.

Still another object of the invention is to provide a power transmission system of practical application in land vehicles and other devices or mechanisms.

BRIEF DESCRIPTION OF THE DRAWINGS

These objects, and other features and advantages of this invention will become readily apparent upon reference to the following description when taken in conjunction with the accompanying drawings, wherein:

FIG. 1 is a side elevational view, partly in section, showing the principal elements of the invention in their intended assembled relation;

FIG. 2 is a front perspective view, with parts broken away and in section, showing some of the more critical coacting components of the invention;

FIG. 3 is an enlarged side elevational view of a component acting as a sun gear of the system;

FIG. 4 is a partial side elevational view showing a component of the system acting as a valve and its association with the sun gear shown in FIG. 3;

FIG. 5 is an enlarged, partial side view of a portion of a modified version of the sun gear shown in FIG. 3;

FIG. 6 is a perspective view, partly in section showing a modified version of the subject invention;

FIG. 7 is a rear elevational view, partly in section of the system illustrated in FIG. 6 and its mounting alignment with the sun gear shown in FIG. 3;

FIGS. 8 and 9 are enlarged partial side elevational views in section, illustrating the components of FIGS. 6 and 7 acting as an emergency pressure relief valve for the system of the present invention; and FIG. 10 is a schematic view of the internal components of a conventional land vehicle incorporating the present invention as a power transmission device therefor.

DESCRIPTION OF THE PREFERRED EMBODIMENTS

Construction

As shown in FIG. 1, a first bearing block 10 supports a set of bearings 12 of any suitable construction, and includes inlet 14, annular channel 16 and annular recessed 18. The bearing block 10 preferably is made from a metal alloy or other suitable material and is peripherally mounted in a stationary manner by any suitable means. Inlet 14 is of a size and position to allow sufficient entrance to pump fluid into the system, and annular channel 16 is of a size and position that provides sufficient channeling of pump fluid away from inlet 14.

Annular channels 18 formed in the first bearing block 10 receive removable or unremovable sealing members such as O-rings 20 which are preferably made from neoprene rubber or any other suitable sealing material.

A power input shaft 22, preferably made from a metal alloy or other suitable material, is rotatably mounted within the bore 15 of the bearing block 10 and engages the bearings 12 and O-rings 20. Drilled, bored or otherwise formed in the power input shaft 22 is a radial inlet channel 24 which is of a size and shape that provides sufficient channeling of the pump fluid from annular channel 16 into a central bore 26 in the shaft 22. Central bore 26 is of a size that provides sufficient channeling of the pump fluid away from inlet channel 24 to an inlet chamber 30 defined by a power input plate 32, secured to or formed integrally with the input shaft 22, and a first gear pump mounting plate 34 of a gear pump casing 36.

The power input plate 32 preferably is made from a metal alloy or other suitable material and is secured to a first gear pump mounting plate 34 by screws 38 or other suitable removable attaching means.

The first gear pump mounting plate 34 preferably is made from a metal alloy or other suitable material and is secured to one side of the gear pump casing 36 by screws 40 or other suitable removable attaching means to allow convenient access to internal components of the gear pump system. Gear pump mounting plate 34 is formed to support bearings 42 of any suitable type and defines a plurality of pump inlets 44.

A second gear pump mounting plate 46 is secured to the other side of gear pump casing 36 by screws 48 or other suitable removable attaching means, and is formed to support bearings 43 as well as to accommodate other components of the system to be described hereinafter.

Inlet chamber 30 is of sufficient size to allow equal distribution of the pump fluid to pump inlets 44 which are of a size that allows sufficient channeling of the pump fluid away from inlet chamber 30 in a manner well known to one skilled in the art.

As shown in FIGS. 1 and 2, gear pump casing 36 and mounting plates 34,46 house a gear pump system 50 comprising a plurality of rotary gears 52 that are seated in cylindrial chambers 54 in a planetary arrangement disposed around and engaging with a sun gear 58 through chamber openings 60. The rotary gears 52 have external gear teeth 62 and are of a size and number that sufficiently meets the operational requirements of the system in accordance with the knowledge of one skilled in the art. Each of the rotary gears 52 comprises extensions or shafts 56 which are rotatably and preferably removably mounted in the bearings 42 and 43. The bearings 42 are formed of a material and construction that suitably withstands the forces created in the system of the present invention.

Sun gear 58 has external gear teeth 64 and is of a size that meets operational requirements of the system. In FIG. 5, there is shown a possible modified version of the sun gear 58 that provides in the external gear teeth 64 a series of generally radial channels 65 which are positioned to allow pump fluid trapped between the involved rotary gear teeth 62 to flow between the adjacent sun gear teeth 64 in cases where the pressure angle of the gear teeth may require it.

Referring to FIGS. 1 and 3, sun gear 58 is formed integrally with or secured to a power output shaft 66 by sun gear mounting plate 68, and rotatably and preferably removably mounted in bearings 70, bearings 72, O-ring 74, O-ring 76, and O-rings 78 positioned within the second mounting plate portion 46 and a second bearing block 126. Bearings 70 and 72 are of a material and construction that suitably withstands the forces inflicted upon them, and O-rings 74, 76 and 78 preferably are made of neoprene rubber or any other suitable material and are of sufficient size and shape to prevent pump fluid leakage around the sun gear mounting plate 68 and the power output shaft 66. Power output shaft 66 and sun gear mounting plate 68 preferably are made of a metal alloy or another suitable material.

Both the sun gear 58 and the rotary gears 52 preferably are made of a metal alloy or other suitable material sufficiently resistant to wear and deformation, in accordance with established practice in the art.

As shown in FIG. 2, the cylindrical chambers 54 formed in the gear pump casing 36 are of a size so as to serve as circumferential compression walls about the rotary gears 52. Similarly, cylindrical chamber 79 formed in the gear pump casing 36 serves as a circumferential compression wall about the sun gear 58. A central chamber 82 is provided in the sun gear 58 to accommodate a cylindrical sleeve valve 84 which is positioned as shown in FIGS. 1 and 2 and clearly illustrated in FIG. 4 as comprising rings or annular portions 86, which are preferably made from a metal alloy or other suitable material and are joined together by sections 87 or other suitable means into a single unit defining annular channels 88, valve inlet ports 90 and a central outlet chamber 92.

As shown in FIGS. 3 and 4, positioned between the external gear teeth 64 of the sun gear 58 are a plurality of inlet ports 80 which are preferably of a trapezoidal or other suitable shape that allows convenient accurate control of their area by the rings 86 of the valve 84 when it is axially or longitudinally moved within the central chamber 82 of the sun gear 58, in a manner to be described more specifically hereinafter.

Referring again to FIG. 1, integrally formed with or secured to the cylindrical sleeve valve 84 is a mounting plate 94 which is preferably removably secured to a valve control piston 96 by a screw 98 or any other attaching means. Valve control piston 96 comprises a plunger 100 housing an O-ring 102 to provide a seal within a central bore 104 in the power output shaft 66. Mounting plate 94, valve control piston 96 and plunger 100 preferably are made of a metal alloy or other suitable material. O-ring 102 preferably is made of neoprene rubber or another suitable material and is of a size and shape that sufficiently prevents the leaking of a secondary pump fluid in the chamber 106 defined by the bore 104 from one side of the plunger 100 to the other side thereof. Formed in the shaft 66 within the bore 104 are annular channels 18 which receive O-rings 110 that are preferably made of neoprene rubber or another suitable material and are of a size and shape to provide a seal around the valve control piston 96 to prevent leakage of a secondary fluid from chamber 106 in the power output shaft 66.

Drilled or otherwise formed in power output shaft 66 is a secondary pump fluid feed system comprising longitudinal feed channels 112, 114 and connecting shaft inlet-outlet channels 116, 118 which are of a shape and size to supply the necessary secondary pump fluid pressure to chamber 106 for effecting longitudinal movement of cylindrial sleeve valve 84 within the sun gear bore 82.

Formed in valve control piston 96 and screw 98 is a central bore 120 which is of sufficient size and shape to properly channel and withstand pump fluid flow pressure exiting from central outlet chamber 92 within the sun gear. Extending axially from central bore 120 is an outlet bore 122 which is of a size and position to sufficiently channel pump fluid from central bore 120 to a radial shaft outlet 124 in the power output shaft 66. Shaft outlet 124 is of a sufficient size to provide sufficient channeling of the pump fluid to the exterior of the power output shaft 66.

Rotatably supporting power output shaft 66 by bearings 73 and O-ring 78 is a second bearing block 126 which is preferably made of a metal alloy or other suitable material and is peripherally supported in a stationary manner by any suitable means. Formed in the base 127 of bearing block 126 are a series of annular channels 128 that support the O-rings 78.

Another annular channel 130 formed in bearing block 126 is positioned in alignment with the shaft outlet 124 and is of a size capable of channeling pump fluid away from shaft outlet 124 to and through a radial outlet 132 formed in the second bearing block 126.

Another annular channel 134 formed in bearing block 126 is positioned in alignment with the shaft inlet-outlet 116 to sufficiently channel secondary pump fluid to and from shaft inlet-outlet channel 116 and an inlet-outlet channel 136 formed in the bearing block 126.

A further annular channel 138 formed in bearing block 126 is positioned in alignment with the shaft inlet-outlet channel 118 to sufficiently channel secondary pump fluid to and from inlet-outlet channel 140 formed in the bearing block 126.

An external cooling system 141 of any suitable type or other suitable external recirculatory heat exchanging system is provided directly or indirectly connected to the pump fluid outlet 132 in the bearing block 126 and pump fluid inlet 14 in the bearing block 10 by line 139. External cooling system 141 preferably is of a construction capable of cooling and possibly storing the pump fluid after it has circulated through the system and then recirculated the pump fluid back into the system.

A modified version of the present invention is shown in FIGS. 6, 7, 8 and 9, incorporating an adjustable, preferably manually controlled emergency pressure relief valve system comprising channels 142, 144 and 146, plunger 148, spring mechanism 150, and a reset button 152 provided in and on the power outlet shaft 66 and sun gear mounting plate 68. Specifically, channel 142 is formed in the sun gear mounting plate 68 and is of a size and position so that pump fluid may sufficiently bleed into it from an area of critical pressure between rotary gear teeth 62 and sun gear teeth 64, and flow into channel 144 which is formed in power output shaft 66 and is of sufficient size to carry pump fluid to plunger 148 in the shaft 66. Plunger 148 preferably is made of a metal alloy or other suitable material and is formed with an annular channel or recess 156 which is of sufficient size to meet the operational requirements placed upon it.

An adjustable spring mechanism 150 of any suitable type or other suitable device is provided within channel 144 to furnish adjustable resistance to the pump fluid pressure applied to plunger 148.

A channel 146 provided in power output shaft 66 is of a size and position that when excessive pressures in channel 144 longitudinally move plunger 148, the necessary amount of secondary pump fluid may freely flow from feed channel 112 in shaft 66 to shaft outlet 124, allowing secondary pump fluid pressure from feed channel 114 to provide the necessary adjustment of piston 96 and cylindrical sleeve valve 84 for relieving all drive pressures.

As shown in FIGS. 8 and 9, a preferably manually operable reset button 152 incorporating a biasing spring 158 or other suitable mechanism is provided in a position in power output shaft 66 that when said excessive pressures do occur it sufficiently engages with annular deprssion 160 formed in plunger 148 to temporarily lock plunger 148 in position.

FIG. 10 illustrates schematically a land vehicle 163 having a transmission system 164 incorporating the present invention so that it provides a convenient means of power transmission from a motor 166 or other similar drive mechanism to a driven wheel system 168 or other similr mechanisms to be driven. A conventional secondary pump fluid control device 170 is provided to directly control the secondary pump fluid pressures controlling valve control piston 96. A motor efficiency device 172 such as a tachometer or the like is provided to regulate the pump fluid control device 170 either directly or indirectly through a human controller 174 or other suitable control system, in a manner that results in extremely efficient operation of the motor 166.

Operation

With a mechanism to be driven by power output shaft 66 driven by sun gear 58 in an initially stationary mode, a driving force is applied by any suitable means to power input shaft 22 which rotatably drives gear pump casing 36. Rotary gears 52 then rotate within thein positions in gear pump casing 36, owing to their rotation around and engagement with sun gear 58. This rotation of the rotary gears 52 in conjunction with the sun gear 58 creates a positive displacement gear pump action on a pump fluid passing through the system. In consequence, the pump fluid that enters at the inlet 14 in first bearing block 10 is pumped through annular channel 16, shaft inlet 24 and the central bore 26 into the inlet chamber 30 between the first mounting plate 34 and inlet plate 32. From the inlet chamber 30, the pump fluid is pumped through pump inlet 44 into the cylindrical chambers 54 in which the rotary gears 52 are disposed. Upon entering cylindrical chambers 54, the fluid is carried around the chambers 54 by the external rotary gear teeth 62, which forces and traps the pump fluid between the external gear teeth 64 of the sun gear 58.

In the operation of the modified version of the sun gear 58 shown in FIG. 5, the channels 65 allow sufficient pump fluid to escape from between the external rotary gear teeth 62 and to channel between the external sun gear teeth 64. This allows the pump fluid pressure to be concentrated in the area between the external sun gear teeth 64 where the most efficient pump fluid pressures occur.

At this point, the pressure or resistance of the pump fluid trapped between the external sun gear teeth 64 forces the sun gear 58 to rotate at a rate that tends to match the rotation of the rotary gears 52. The amount of pressure between the external sun gear teeth 64 determines the extent of this energy transfer from the rotary gears 52 to the sun gear 58. If this particular mode of operation were to continue with no release of the fluid prssure or resistance, the sun gear would attain a condition of being locked with the rotary gears 52 and thus would rotate at the same speed as the power input shaft 22.

In this invention, inlet ports 80 in the sun gear 58 allow sufficient escape of the pump fluid from between the gear teeth 64 to create the aount of slippage or free motion necessary to provide gradual transfer of the energy, and what relatively compares to providing a difference in gear ratios between the rotary gears 52 and the sun gear 58.

Longitudinal adjustment of the cylindrical sleeve valve 84 by the valve control piston 96 or other similar control mechanism regulates the area of valve inlet ports 80 and therefore the pump fluid volumes and pressures are allowed to escape from between the external sun gear teeth 64.

Referring to FIG. 1, in operating the valve control piston 96; by applying to a secondary pump fluid entering inlet-outlet channel 140 in bearing block 126 which is greater than the pressure applied to secondary pump fluid entering inlet-outlet channel 136 in thebearing block 126, the relative pressures resulting in chamber 106 on the plunger 100 cause the valve control piston 96 to move the cylindrical sleeve valve 84 toward the power output shaft 66. This operation results in the closing action or area-restricting action of the valve inlet ports 80 by the rings 86 of valve 84, as shown in FIG. 4.

By applying pressure to a secondary pump fluid entering inlet-outlet channel 136 that is greater than the pressure applied to a seconary pump fluid entering inlet-outlet channel 140, the relative pressure resulting in chamber 106 on the plunger 100 causes the valve control piston 96 to move the cylindrical sleeve valve away from the power output shaft 66. This operation results in the opening action or area expansion action of the valve inlet ports 80 by the rings 86 of valve 84.

This operation of the piston 96 within the output shaft 66 provides controllable adjustment of the energy transmission qualities of the system while restricting all extreme pump pressure to the area between the external rotary gear teeth 62 and external sun gear teeth 64. The trapezoidal shape of the inlet ports 80 provides for gradual adjustment of fluid flow and thus energy transmission. Desired torque and speed factors that are to be ultimately achieved may be set prior to operation or variably adjusted during operation without interrupting continuous transmission of power.

In continuing with the fluid flow, as the system pumps hydraulic fluid into central outlet chamber 92 within sun gear 58, it then proceeds through central bore 120 in valve piston 96, outlet bore 122 in output shaft outlet 66 and then through shaft outlet 124. From shaft outlet 124, the pump fluid exits out through annular channel 130 and pump fluid outlet 132 in bearing block 126. From pump fluid outlet 132, the pump fluid may be carried by line 139 to a reservoir or external cooling system for possible recirculation.

It is this unique centralized internal pump fluid flow in conjunction with the external cooling system 141 that offers extremely efficient cooling of the critical components of the system and, therefore, improved performance during operation.

As shown in FIG. 6, a modified version of this invention incorporates an emergency pressure relief valve system. In the operation of this modified version, pump fluid is bled in any suitable manner into channel 142 from an area of critical pressure in the gear pump 50. This bled pump fluid is then channeled through channel 144 in output shaft 66 to apply pressure to a plunger 148. The adjustable spring mechanism 150 applies counter-pressure to the pressure of the pump fluid against plunger 148, and preferably is adjusted to apply counter-pressure relative to the required load limitations of the system. As shown in FIGS. 8 and 9, when pump fluid pressures exceed these limitations, the adjustable spring mechanism 150 allows sufficient longitudinal travel of the plunger 148 so that the reset button 152 engages within the annular depression 160 in the plunger 148 to lock it in a position that results in an open condition of channel 146. This operation then allows secondary pump fluid to escape into shaft outlet 124, allowing secondary pump fluid pressure from feed channel 114 to provide the necessary adjustment of the piston 96 and cylindrical sleeve valve 84 to sufficiently open valve inlet ports 90 for relieving all drive pressures to the sun gear 58. In resetting or reengaging the system for operation, any suitable mechanism may be provided to disengage the reset button 152, allowing plunger 148 to retract back into normal systems operation under the force of spring 150.

A logical application of this system is shown in FIG. 10 wherein the present invention is incorporated as a transmission system 164 for a land vehicle to provide convenient power transfer from the motor 166 to the driven wheel system 168.

In the operation of this application, a motor performance sensing device 172 works either directly or indirectly through a human controller 174, in conjunction with the seconary pump fluid control device 172, to properly adjust the cylindrical sleeve valve 84 in a manner that produces torque and speed conversions of the transmission system 164 to allow the motor to perform at maximum efficiency. In this mode of operation the various torque and speed factors may be smoothly and conveniently provided without having to suspend continuous transmission operation and without having to change gearing or other similar power conversion systems.

What is claimed is:

1. A fluid transmission comprising:
power input means,
first movable gear means connected to said power input means;
second movable gear means engaged with said first gear means;

said second gear means comprising a sun gear having external teeth, and said first gear means comprising a plurality of planetary gears having external teeth in engagement with said sun gear teeth;

casing means enclosing said sun gear and planetary gears and being connected to said input means and supporting said planetary gears;

power output means connected to said sun gear;

means for introducing fluid under pressure between said planetary gears and said sun gear to cause said sun gear to move in response to movement of said planetary gears, thereby transferring power from said input means to said output means;

means for controlling the pressure of said fluid between said planetary gears and said sun gear to vary the power transmission from said input means to said output means, said pressure controlling means comprising a plurality of apertures extending through said sun gear and valve means for controlling flow of said fluid through said apertures; and said output means having a channel therethrough in communication with said sun gear apertures, whereby fluid may be circulated through said sun gear and said output means to cool them.

2. The fluid transmission of claim 1 wherein said output means comprises an output shaft, and said channel extends substantially longitudinally through said shaft for circulating fluid therethrough.

3. The fluid transmission of claim 1 wherein means are provided to cool the fluid introduced between said planetary gears and said sun gear.

4. The fluid transmission of claim 1 wherein fluid-actuated valve control means is mounted within said output means and connected to said valve means for controlling the operation thereof.

5. The fluid transmission of claim 1 wherein a plurality of generally radially extending channels are provided in the external teeth of said sun gear to allow fluid pressure to be concentrated in the area between said sun gear teeth in engagement with said planetary gear teeth.

6. The fluid transmission of claim 1 wherein means are provided in said output means to relieve fluid pressure between said sun gear and said planetary gears when it exceeds a predetermined value.

7. The fluid transmission of claim 1 wherein said sun gear apertures are tapered in cross section so as to provide for gradual control of the fluid flow therethrough by said valve means.

8. The fluid transmission of claim 7 wherein said valve means comprises an annular valve member slidably mounted within said sun gear and having a plurality of openings therethrough adapted to be aligned with said sun gear apertures.

9. The fluid transmission of claim 7 wherein said valve control means comprises a piston slidably mounted within said output means, and further comprising means for introducing a secondary fluid within said output means to control the movement of said piston.

* * * * *